(12) United States Patent
Ng

(10) Patent No.: US 9,656,288 B2
(45) Date of Patent: May 23, 2017

(54) DISPENSING DEVICE FOR CONVENIENTLY DISPENSING MATERIAL

(71) Applicant: Chiu Ho Ng, Hong Kong (HK)

(72) Inventor: Chiu Ho Ng, Hong Kong (HK)

( * ) Notice: Subject to any disclaimer, the term of this patent is extended or adjusted under 35 U.S.C. 154(b) by 61 days.

(21) Appl. No.: 14/884,367

(22) Filed: Oct. 15, 2015

(65) Prior Publication Data

US 2017/0106403 A1    Apr. 20, 2017

(51) Int. Cl.
*B05C 17/01* (2006.01)
*B05C 17/005* (2006.01)
*G01F 11/00* (2006.01)

(52) U.S. Cl.
CPC .... *B05C 17/0126* (2013.01); *B05C 17/00576* (2013.01); *B05C 17/00596* (2013.01); *G01F 11/00* (2013.01); *G01F 11/003* (2013.01); *G01F 11/006* (2013.01)

(58) Field of Classification Search
CPC .......... B05C 17/0126; B05C 17/00576; B05C 17/00596; G01F 11/00; G01F 11/003; G01F 11/006
USPC ...................... 222/391, 465.1–474, 325–327
See application file for complete search history.

(56) References Cited

U.S. PATENT DOCUMENTS

| | | | | |
|---|---|---|---|---|
| 6,386,401 B1* | 5/2002 | Dodd | ...................... | B05C 17/01 222/391 |
| 6,598,764 B1* | 7/2003 | Stern | .................. | B05C 17/00583 222/105 |
| 6,926,177 B1* | 8/2005 | Scott | .................. | B05C 17/00516 222/326 |
| 2007/0172789 A1* | 7/2007 | Muller | .................... | A61C 5/066 433/90 |
| 2007/0181607 A1* | 8/2007 | Calvo | .................. | B05C 17/0123 222/391 |
| 2010/0327024 A1* | 12/2010 | Nobusawa | .......... | B05C 17/0126 222/391 |
| 2016/0045930 A1* | 2/2016 | Hoover | ............... | B05C 17/0103 222/136 |

* cited by examiner

*Primary Examiner* — Paul R Durand
*Assistant Examiner* — Andrew P Bainbridge

(57) ABSTRACT

According to embodiments of the invention, apparatuses and devices are provided for a liquid compound dispensing device. Generally, the dispenser includes a frame for carrying a composition, a plunger shaft having a piston at one end for urging the composition out of the frame, and one or more plunger driving assemblies for driving the actuator shaft to expel the compound. The plunger driving assemblies may have one or more downwardly extending handles, and the assembly includes one or more triggers extending upwardly within the housing. One or more triggers may be pressed to expel compound. Further, one or more triggers and/or handles may be movable to different portions of the dispensing device.

1 Claim, 4 Drawing Sheets

DISPENSING DEVICE FOR CONVENIENTLY DISPENSING MATERIAL

FIELD OF THE INVENTION

The present invention generally relates to hand tools and more particularly to compound application and dispensing tools.

BACKGROUND OF THE INVENTION

There are many different types of liquid dispensers. Soap dispensers, for example, are used commonly in our homes and workplaces. A conventional household soap dispenser consists of a housing which holds a package of liquid soap sitting squarely on a flat surface, such as a table or counter. The package of soap usually comes with a feeding tube, which is placed on a holding base. When a user merely presses a cover or a handle with a finger, a small amount of liquid soap for cleaning is released into a hand of a user.

Similar dispensers are used to store and dispense many other types of liquids and materials. For example, glue dispensers have been widely used in building construction, decoration, electronics, motor vehicles, parts applications, and container industries. Unlike soap dispensers, which sit squarely on a flat surface when used, other industrial dispensers need to be held by the user during use. Such devices dispense materials such as caulk, cement, glue, liquid nails, paints, enamels, urethane, vinyl, polyester, epoxy and other plastics or resins. These different compositions have different densities. Regardless, an effective caulk gun must be capable of delivering the various compositions with uniformity.

Caulk is commonly a used compound for home repair and the like. The compound or caulk is typically applied to militate against liquid and air from penetrating the interface between building components. A caulking gun or dispenser is used to hold a cartridge containing caulk and cause the caulk to be dispensed from a nozzle on the cartridge. Caulk dispensers typically include a front and back handle forming a handle assembly that is squeezed together by the user to generate force for forcing caulk, adhesives, etc. contained within the tube out through the tip of the tube.

In prior art caulking guns, the actuator or plunger for forcing the caulk from the cartridge containing caulk is caused to move in an axial direction toward the cartridge nozzle while the cartridge remains fixed. As the cartridge containing caulk is emptied, the weight of the remaining caulk is concentrated at one end of the cartridge. Moreover, although the handle assembly allows the user to generate this force with one hand, the handle grips of the caulk gun are typically hard and can generate uncomfortable compression injuries to the inner surface of the user's hands if used for an extended period of time. Interestingly, current dispensers have only one trigger and one handle. This makes it much more difficult to hold the handle while pulling the trigger in order to apply the compound accurately and appropriately.

An object of the invention is to produce a compounder dispenser which has two trigger members thereby making it much easier to use. Another object of the invention is to produce a compounder dispenser which is economical and simple in structure, having the ability to be placed upright on a flat surface. Still another object of the invention is to produce a compounder dispenser which is surprisingly well balanced thus enabling the user longer duty cycles without undue fatigue. Another object of the invention is to produce a compounder dispenser where the user is able to insert and remove the cartridge containing caulk with ease.

SUMMARY OF THE INVENTION

According to embodiments of the invention, apparatuses and devices are provided for a liquid compound dispensing device. Generally, the dispenser includes a frame for carrying a composition, a plunger shaft having a piston at one end for urging the composition out of the frame, and one or more plunger driving assemblies for driving the actuator shaft to expel the compound. The plunger driving assemblies may have one or more downwardly extending handles, and the assembly includes one or more triggers extending upwardly within the housing. One or more triggers may be pressed to expel compound. Further, one or more triggers and/or handles may be movable to different portions of the dispensing device.

In one embodiment of the disclosed technology, a dispensing device is provided for conveniently dispensing material such as caulk, cement, glue, liquid nails, paints, enamels, urethane, vinyl, polyester, epoxy and/or other plastics or resins. The terms "caulk gun", "caulking gun", "compound dispenser", "dispensing device", and/or "dispenser" may be used interchangeably throughout the specification, but should be construed generally to describe the device according to one or more embodiments of the disclosed technology. The dispensing device may be composed of one or more of the following components: a) a first holding assembly having a first handle and a first trigger member; b) a longitudinal housing with a top surface a first side surface, a second side surface, and a bottom surface; c) an opening defined in the top surface of the housing; d) an open area defined by the bottom surface of the housing, with a retaining cuff; e) an interior void defined by the housing for receiving a compound cartridge therein; f) a longitudinal actuator having teeth on both sides thereof, the longitudinal actuator movably mounted to the housing through the opening in top surface, wherein the longitudinal actuator moves incrementally when the trigger member is engaged; and/or g) a contacting element disposed at an end of the longitudinal actuator, wherein the contacting element causes compound to be released by providing a force on the cartridge.

As discussed, compounds are typically stored in a cartridge having an elongated, cylindrical tube. The cartridges may be disposable and have a nozzle at one end, and an opening at the other end. In the opening a plate or actuator may sit firmly within the tube. In order to extrude compound material, the actuator (not to be confused with the longitudinal actuator of the dispenser) is pushed towards the nozzle to forcibly eject the viscous compound through an opening in the nozzle. The nozzle faces the open area of the first side surface of the housing. The nozzle directs the dispensed compound in a direction away from the open area of the first side surface when the contacting element provides a force on an end of the cartridge.

In a further embodiment, during operation, the dispensing device may operate in a mode that does not require a user to hold the longitudinal housing. In this embodiment, during operation, the bottom surface of the container of the dispensing device is placed flat on a planar surface. In another embodiment, the cartridge may further include a nozzle facing the open area of the bottom surface of the housing for directing the dispensed compound to be released from the open area of the bottom surface when the contacting element provides a force to the container. Still further, the dispensing device may include a second holding assembly disposed opposite to the first holding assembly. The second holding assembly may have a handle and a trigger member as well.

During operation, the longitudinal actuator may move incrementally when the trigger member of either the first or second holding assembly is engaged. Furthermore, during operation, the dispensing device may operate in a mode that requires a user holding the longitudinal housing with one hand while using another hand to engage the trigger member of the first holding assembly.

In still a further embodiment of the disclosed technology, the second holding assembly may be configured to be detached from the top surface to attach to the second side surface of the longitudinal housing allowing the user to hold the longitudinal housing with one hand via the second holding assembly while using another hand to engage the trigger member of the first holding assembly.

A better understanding of the disclosed technology will be obtained from the following brief description of drawings illustrating exemplary embodiments of the disclosed technology.

A better understanding of the disclosed technology will be obtained from the following detailed description of embodiments of the disclosed technology, taken in conjunction with the drawings.

DETAILED DESCRIPTION

References will now be made in detail to the present exemplary embodiments, examples of which are illustrated in the accompanying drawings. Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

Figure 1:
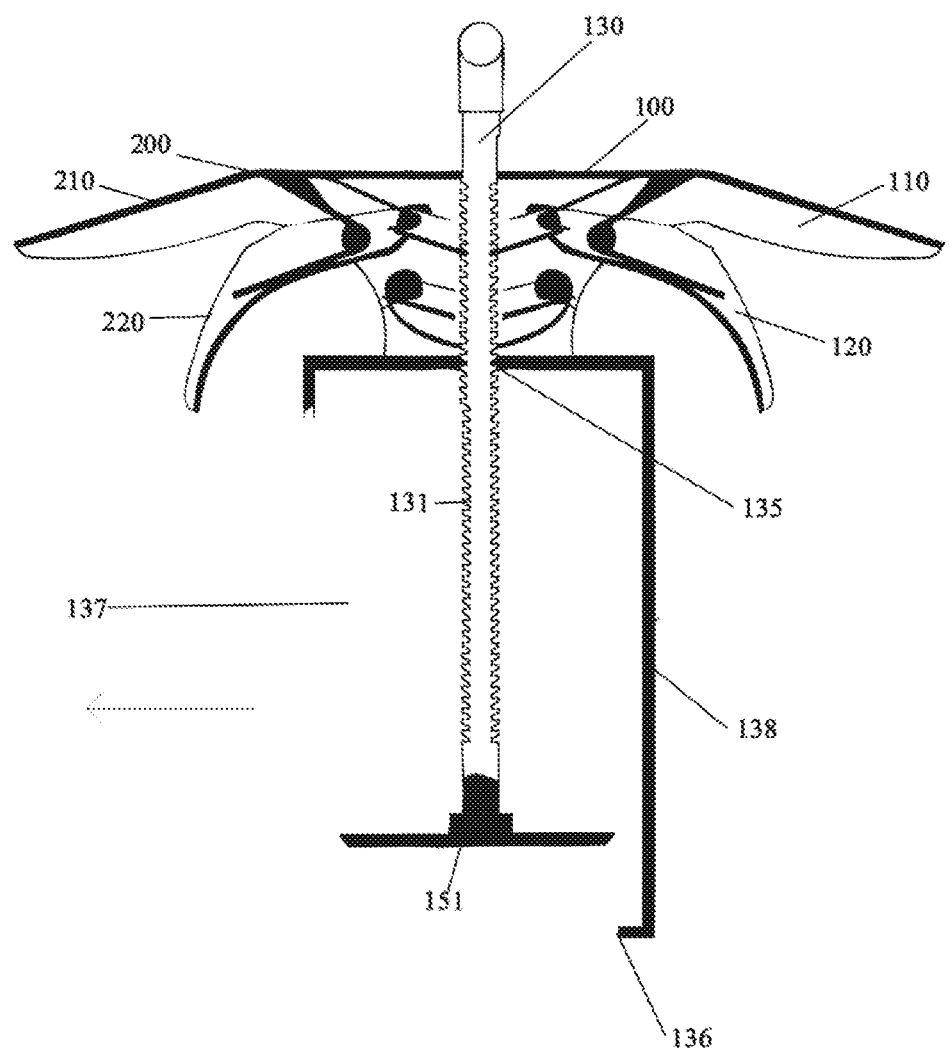
FIG. 1 shows an elevational view of a dispenser assembly with portions cut-away according to embodiments of the disclosed technology.

Referring now to FIG. 1, an elevational view is shown of a dispenser assembly with portions cut-away according to embodiments of the disclosed technology. The dispenser includes a plunger or contacting element 151 having a plunger shaft or longitudinal actuator 130 with teeth 131 which is driven by a first holding assembly 100. The first holding assembly 100 has a fixed handle 110. The dispenser includes a housing 138, and a trigger member 120 pivoted at a screw hinge located piston above the longitudinal actuator 130. At an end of the housing 138, a cuff or lip 136 is employed to retain compound containing cylinders within the housing. The compound containing cylinders are contained within a void or an open area 137 defined by the housing 138.

In further embodiments, the first assembly 100 may further include a bearing assembly located on or near a portion of trigger 120 which extends above screw hinge. In addition, a trigger stop mechanism may be provided on the downwardly extending handle 110 to adjust the arc of trigger 120 for reducing hand fatigue.

Referring still to FIG. 1, a second holding assembly 200 may be provided opposite to the first holding assembly 100 with respect to the actuator 130. The second holding assembly 200 may likewise have a second handle 210 and a second trigger 220. Each of the holding assemblies 100, 200 may be used to hingedly thrust the actuator 130 forward. The teeth 131 are contacted by portions of the triggers 120, 220 to cause the actuator 130 to thrust away from the assemblies to cause compound to be extruded from a cylindrical cartridge. The actuator 130 extends through an opening 135 disposed at an end of the housing 138.

Figure 2:
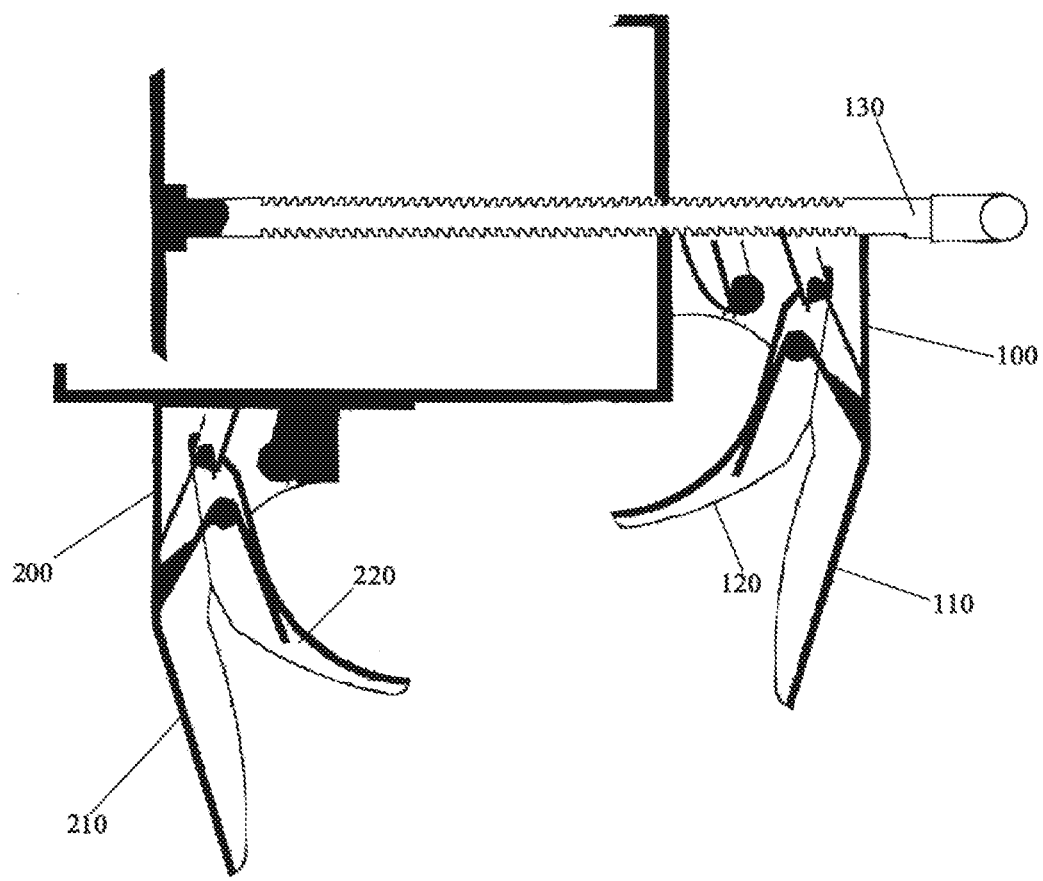
FIG. 2 shows a cut-away side elevational view of a dispenser assembly with two opposing handles according to embodiments of the disclosed technology.

FIG. 2 shows a cut-away side elevational view of a dispenser assembly with two opposing handles according to embodiments of the disclosed technology. In this embodiment, the second handle assembly 200 is disposed on the opposite end of the housing 138 from the first handle assembly 100. Likewise, the second trigger 220 in oriented in the opposite direction from the first trigger 120. This embodiment enables a user to use two hands to carefully eject and apply compound.

Figure 3:
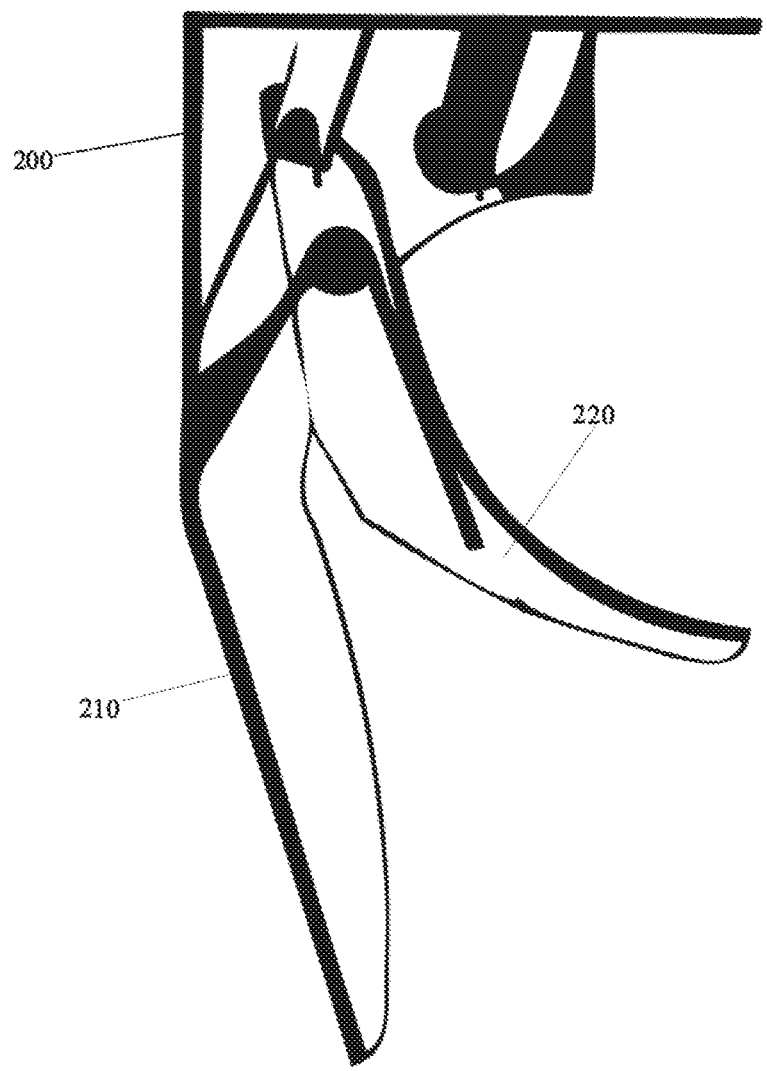
FIG. 3 is a stand-alone view of a holding assembly and trigger mechanism that may be used to carry out embodiments of the disclosed technology.

FIG. 3 is a stand-alone view of a holding assembly and trigger mechanism that may be used to carry out embodiments of the disclosed technology. More particularly, FIG. 3 shows the second holding assembly 200 of FIG. 2 in greater detail. As depicted, the second holding assembly has a second handle 210 and a second trigger 220 which, when pressed towards one another, cause the actuator to be incrementally biased through the housing.

The stand-alone view of FIG. 3 is also indicative of the ability of the second holding assembly 200 to be detached from dispenser and releasably attached to another portion of the dispenser. Thus, for example, the second assembly 200 of FIG. 1 may be detached, and reattached in a configuration similar to that of FIG. 2. The different arrangements may be suitable for different uses and applications of the dispenser.

Figure 4:
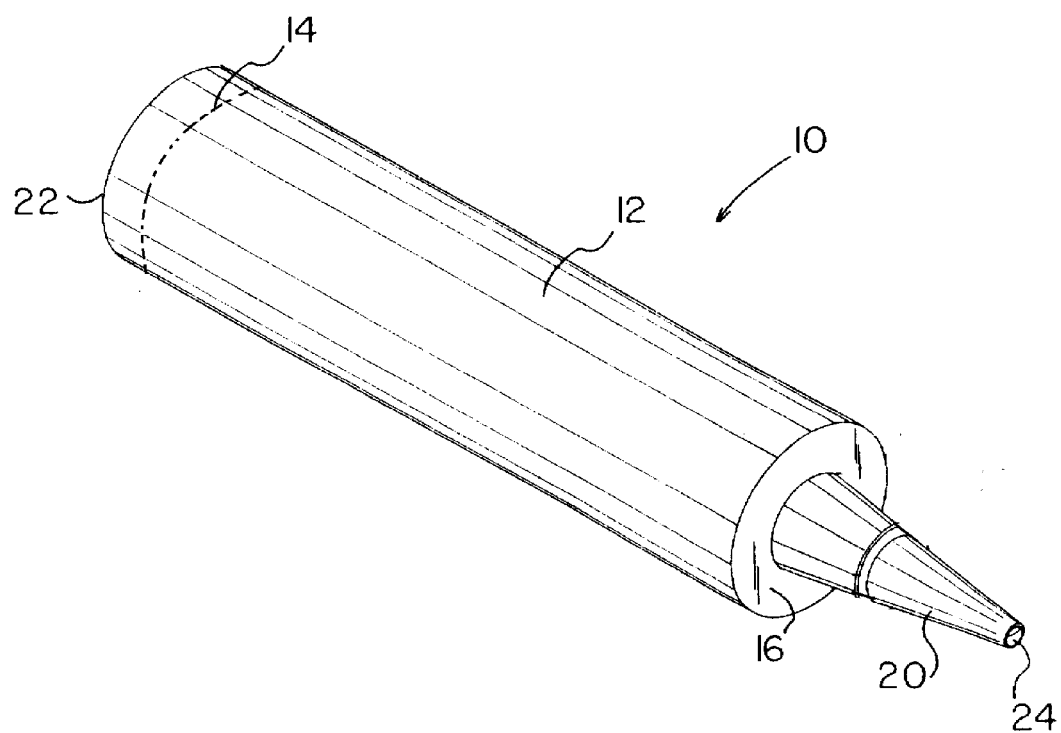
FIG. 4 shows an exemplary compound cartridge that may be used in one or more embodiments of the dispenser of the disclosed technology.

FIG. 4 shows an exemplary compound cartridge that may be used in one or more embodiments of the dispenser of the disclosed technology. The term "caulk" and/or "compound" are used throughout the application, but it will be readily understood that the invention is not limited to any one particular material, and that the material being dispensed may be selected from a wide variety of materials such as sealants and adhesives, viscous grinding compounds and lubricating materials, paints, colors and colorants, and even food materials. Such compounds are typically stored in a cartridge 10 having an elongated, cylindrical tube 12. The cartridges 10 are disposable and have a nozzle 20 at one end 16, and an opening at the other end 22. In the opening a plate or actuator 14 sits firmly within the tube 12. In order to extrude compound material, the actuator 14 (not to be confused with the longitudinal actuator of the dispenser) is pushed towards the nozzle 20 to forcibly eject the viscous compound through an opening 24 in the nozzle.

While the disclosed invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the devices described hereinabove are also contemplated and within the scope of the invention.

What is claimed:

1. A dispensing device for conveniently dispensing material, comprising:
    a first holding assembly having a first handle and a first trigger member;
    a longitudinal housing with a top surface a first side surface, a second side surface, and a bottom surface;
    an opening defined in the top surface of the housing;
    an open area defined by the bottom surface of the housing;
    an interior void defined by the housing for receiving a cartridge having an extrudable material therein;
    a longitudinal actuator having teeth on both sides thereof, the longitudinal actuator movably mounted to the housing through the opening in the top surface; and
    a contacting element disposed at an end of the longitudinal actuator, wherein the contacting element causes compound to be released by providing a force on the cartridge;
        wherein the cartridge further includes a nozzle facing the open area of the bottom surface of the housing for directing the dispensed compound to be released from the open area of the bottom surface when the contacting element provides a force to the container,
    wherein the dispensing device further includes a second holding assembly disposed opposite to the first holding assembly such that the second holding assembly is reflected across an axis drawn longitudinally through the actuator,
    wherein the second holding assembly comprises a second handle and a second trigger member,
    wherein the longitudinal actuator moves incrementally when the trigger member of either the first or the second holding assembly is engaged,
    wherein during operation of the dispensing device the trigger member of the first holding assembly is engaged by one hand of the user, while the longitudinal housing is held by another hand of the user, and
    wherein the second holding assembly is configured to be detached from the top surface to attach to the second side surface of the longitudinal housing allowing the user to hold the longitudinal housing with one hand via the second holding assembly while using another hand to engage the trigger member of the first holding assembly.

* * * * *